F. L. G. KOLLMORGEN.
BINOCULAR TELESCOPE.
APPLICATION FILED MAY 3, 1913.
1,168,650.
Patented Jan. 18, 1916.
3 SHEETS—SHEET 1.
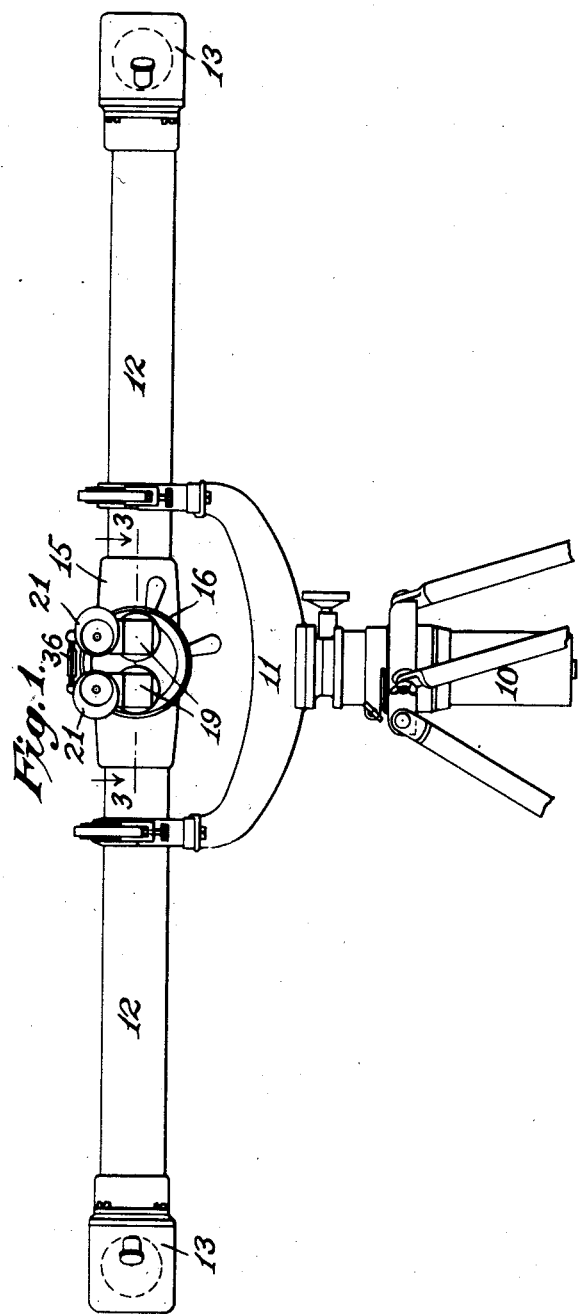
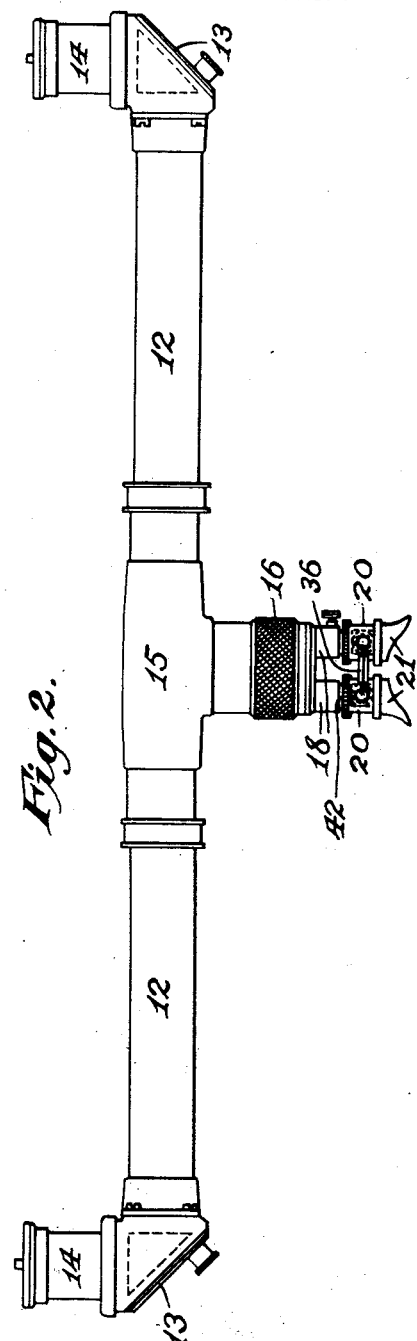
Attest:
Clarence G. Campbell
Mary H. Lewis
Frederick L. G. Kollmorgen, Inventor:
by William R. Baird
his Atty

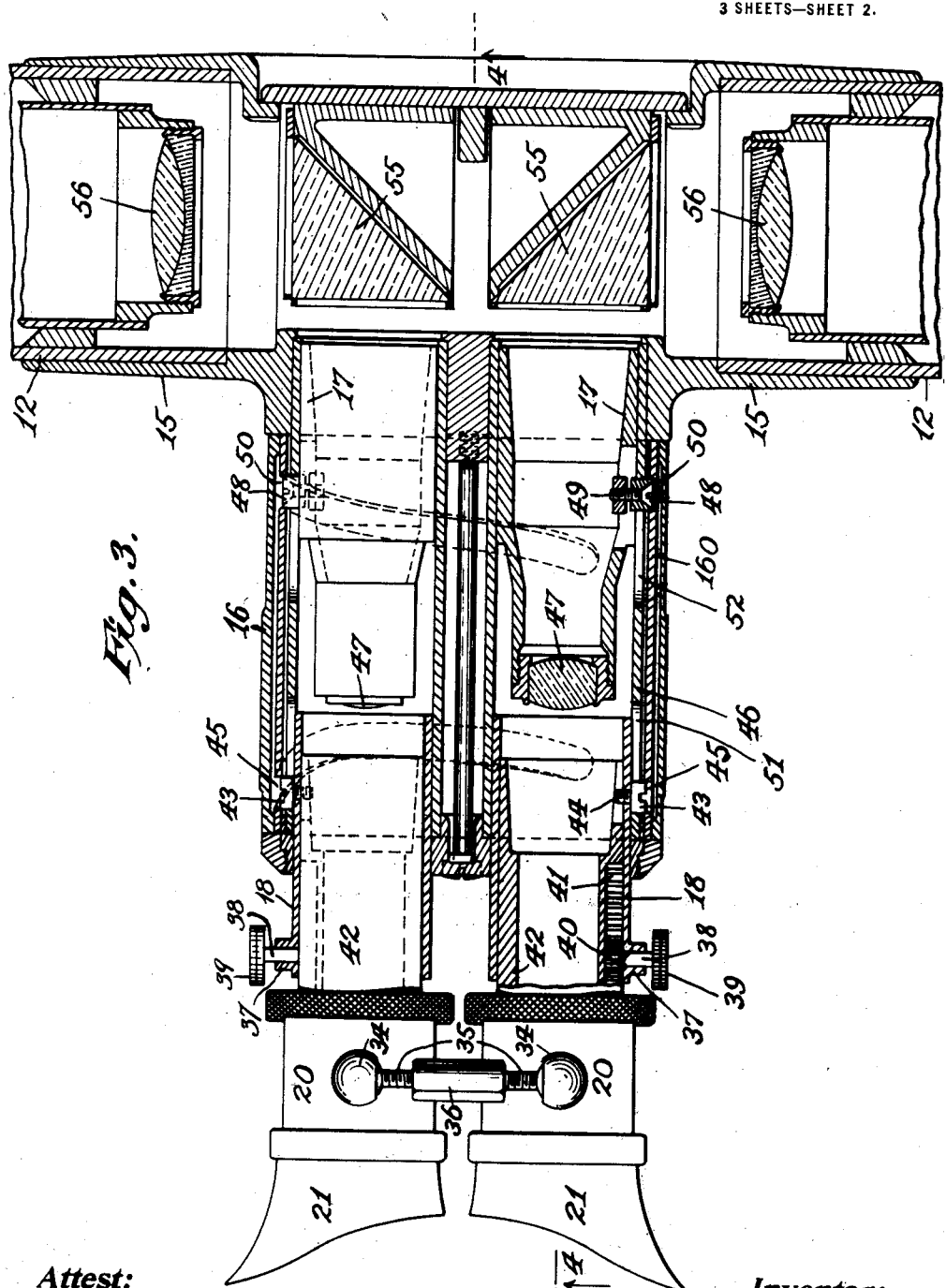

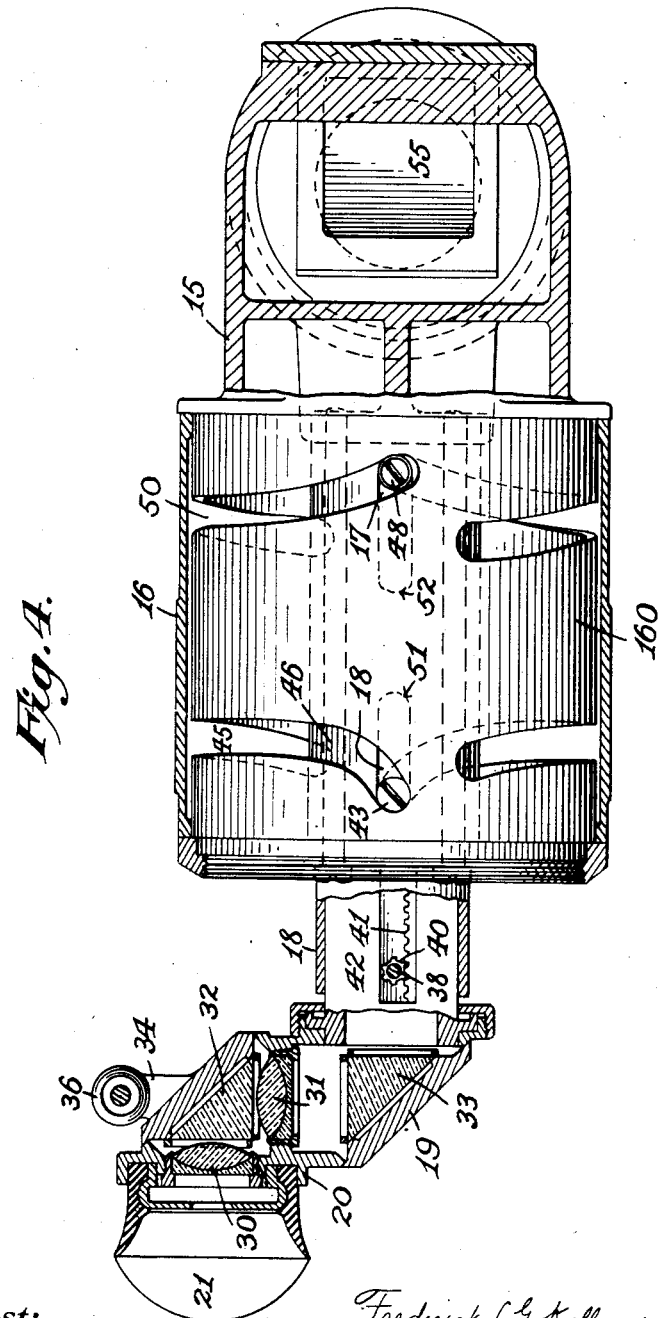

UNITED STATES PATENT OFFICE.

FREDERICK L. G. KOLLMORGEN, OF BOONTON, NEW JERSEY, ASSIGNOR TO KEUFFEL & ESSER COMPANY, OF HOBOKEN, NEW JERSEY, A CORPORATION OF NEW JERSEY.

BINOCULAR TELESCOPE.

1,168,650.  Specification of Letters Patent.  Patented Jan. 18, 1916.

Application filed May 3, 1913. Serial No. 765,222.

*To all whom it may concern:*

Be it known that I, FREDERICK L. G. KOLLMORGEN, a citizen of the United States, residing at Boonton, in the county of Morris and State of New Jersey, have invented certain new and useful Improvements in Binocular Telescopes, of which the following is a specification.

This invention relates to binocular telescopes and more especially to telescopes intended to be used in connection with target practice to locate the spot where the shot from the gun has struck in the vicinity of the target.

With the ordinary binocular telescopes, the distance between the two object glasses is not sufficiently large to afford an accurate observation of the distance between the spot where the shot struck and the target and it is, therefore, desirable in making such observations to provide a telescope with objective optical elements separated at a greater distance apart than the usual interpupillary distance. When, however, telescopes are provided with objective optical elements separated at such a distance apart, and are also provided with eye-piece elements relatively adjustable to suit the interpupillary distance of the observer and with suitable optical elements to deflect the rays of light from the object sought to be observed to the eyes of the observer, means must be provided for varying the magnification in order to suit both the varying atmospheric conditions and the personal equation of the observer. This variation has heretofore been accomplished by the use of different eye pieces removable from the instrument and these eye pieces in consequence become lost or displaced, and when there is need to use the binocular for the purpose stated, especially in the hurry and confusion of a conflict, great inconvenience results.

It is the purpose of this invention to provide a binocular telescope of the class referred to with means not only for varying the magnification but doing it continuously between two limits in both eye pieces of the binocular, and to the same degree in both eye pieces simultaneously. This is done by means of the novel construction hereinafter described and claimed.

In the drawings, Figure 1 is a front elevation of a binocular telescope embodying the invention; Fig. 2 is a plan view thereof; Fig. 3 is a horizontal section of the eye piece elements, the erecting elements and reflecting elements and means for varying the magnification taken on the plan of the line 3—3 in Fig. 1, and on an enlarged scale; and Fig. 4 is a central vertical section of the parts illustrated in Fig. 3, taken on the plan of the line 4—4 in that figure.

In the drawings, 10 represents a framework or standard upon which the other parts of the instrument are supported.

11 is a sub-frame resting upon the standard 10 and having two laterally extending members, on which are suitably supported and to which are properly secured, two laterally extending tubes 12, each one of which is provided with a reflector or prism housing 13 and which housing is in turn connected to a tube 14 of usual form and which if it contains the objective optical elements, is called the objective tube. These objective elements are not necessarily placed in this tube 14 but may be placed anywhere in a suitable position in the tube 12. If they are not placed in this tube, it is provided with a plain sheet of window glass in order to prevent dust reaching the reflecting elements contained in the housing 13.

Each of the tubes 12 is connected to a central tube 15 and this central tube is in turn connected to a tube 46 outside of which is arranged a rotatable tubular casing 16 adapted to contain within it two tubes 17 each provided with and supporting suitable erecting optical elements and also adapted to contain two eye piece tubes 18 which are each connected in turn, as hereinafter described, to an elbow housing 19 and an eye-piece housing 20, the latter provided at its extremity with an eye shield 21. Within the housings 19 and 20 are arranged the eye-piece optical elements which, in the form of telescope illustrated, comprise the lenses indicated at 30 and 31, and the reflecting elements or prisms indicated at 32 and 33. The two housings 20 are adjustable laterally with respect to each other by means of brackets 34 with which each one is provided and between which is arranged a right and left screw 35 manipulated by means of a suitable nut 36, and which screw is connected by a universal joint 34 to each bracket. By this means the interpupillary distance may be varied to suit the eyes of the observer. Each eye piece tube 18 is provided at any suitable place with a bearing 37 in which there is adapted to rotate a small tub shaft 38 operated by a handwheel 39 and on the end of which is a pinion 40 adapted to mesh with a rack 41 which is secured to or made integral with a tube 42 which is directly connected to the housing 19 and by means of which this housing and all of the eye-piece optical elements are moved to and fro with respect to the other parts of the apparatus. Each tube 18 is provided with a stud 43 secured to it by means of a screw 44, or other suitable means, and which stud is adapted to engage the walls of a cam slot 45 of hyperbolic curve formed in a tube 160 which is rigidly connected to and moves with the tubular casing 16. It is obvious that when the casing 16 and tube 160 are rotated, the contact of the stud 43 with the walls of this slot will move the tube 18 and consequently the tube 42 and the eye-piece elements along the longitudinal axis of the casing 16 and to and fro with respect to the central tube 15.

Each of the tubes 17 is provided at its end with a suitable erecting element indicated at 47. In the wall of this tube 17 is inserted a stud 48 suitably secured by any convenient means as a screw 49, and which stud is adapted to engage the walls of a cam slot 50 of spiral curve also formed in the tube 160, so that by the rotation of the sleeve 16 and the tube 160 the erecting element 47 is also moved along the longitudinal axis of the tube 16 and to and fro with respect to the tube 15. Outside of both of the tubes 17 and 18 of each set is a rigid tube 46 provided with two longitudinal slots indicated at 51 and 52, which slots are likewise engaged by the studs 43 and 48 and serve to prevent any circular or lateral displacement of the studs as they are moved longitudinally and consequently any circular or lateral displacement of the erecting elements or of the eye piece tube.

55 designates the reflecting elements contained in the central tube 15, and 56 designates regulating lenses of usual form and which belong to the objective combination and the function of which is to regulate the course of the oblique rays from the first lens of the objective elements, which lens, being of usual form, is not shown.

In using the device, the housings 20 containing the eye-piece elements are first adjusted to suit the interpupillary distances of the observer by the manipulation of the nut 36. The correct focus of each set of elements is then obtained by the manipulation of the handwheels 39 one on each tube, and the movement of the eye-piece elements relative to the tubes 18. These two adjustments having been made, and it being assumed that the objective optical elements and their reflecting elements are properly arranged in place, it is obvious that the magnification may be varied by rotating the tubular casing 16 and tube 160 which causes a simultaneous longitudinal movement of the erecting elements and the eye-piece elements. The extent and direction of the movement of the erecting elements being controlled by the shape of the spiral cam slots 50, and the extent and direction of the movement of the eye-piece elements being controlled by the shape of the hyperbolic cam slot 45, these two slots being of such extent and shape as to preserve at all times correct optical relations between these sets of optical elements. Instead of having one of these cam slots spiral and the other hyperbolic, the relative displacements may be obtained according to optical laws by giving both slots an irregular pitch. Each of the eye pieces may be focused independent of any movement of the erecting elements because such focusing is accomplished by means of the rack and pinion with which each of the eye-piece tubes is provided, and the movement of which does not affect the erecting elements, and the focus having been adjusted it remains fixed no matter how much the tube 18 is moved within usual limits.

By the construction outlined, the means for varying the magnification are contained in the instrument itself and not being capable of removal are always in place and, furthermore, as the relative movements of the eye-piece tube and erecting element tube are controlled with respect to each other by the shape and direction of the cam slots 45 and 50, these movements must always remain relatively optically correct and the instrument needs no refocusing after its initial adjustment by the operator, whose duty it is to adjust the interpupillary distance, then focus the eye-pieces and then rotate the tubular casing until he produces the magnification best suited for the particular observation.

What I claim is:

1. In a binocular telescope, the combination with two sets of relatively adjustable optical erecting elements and coacting eye pieces, of means surrounding the sets for relatively adjusting the same.

2. In a binocular telescope, the combination with two sets of relatively adjustable optical erecting elements and coacting eye pieces, of a tube rotatably surrounding both sets and having cam engagements therewith for relatively adjusting the same.

3. In a device of the character described, two pairs of tubes side by side, one of each pair being an eye-piece tube and the second of each pair containing erecting optical elements, the tubes of each pair being in alinement, each tube being provided with a projecting stud, in combination with a shell adapted to encircle both pairs of tubes and provided with cam slots, one slot adapted to engage the studs of each eye-piece tube and another slot adapted to engage the studs of each erecting element tube.

4. In a device of the character described, two pairs of tubes side by side, one of each pair being an eye-piece tube and the second of each pair containing erecting optical elements, and being arranged within a fixed tube provided with a longitudinal slot, the tubes of each pair being in alinement, each tube being provided with a projecting stud, in combination with a shell adapted to encircle both pairs of tubes and the fixed tubes and provided with cam slots, one cam slot and one longitudinal slot of the fixed tube adapted to engage the studs of each eye-piece tube, and the second cam slot and longitudinal slot of the second fixed tube being adapted to engage the studs of each erecting element tube.

5. In a binocular telescope, the combination with two eye pieces, each independently adjustable for pupillary distance and two optical means respectively associated therewith, of common means inclosing both eye pieces, and optical erecting means engaged with the inclosing means for simultaneously varying the distances between each eye piece and its erecting means to vary the magnification of the instrument.

6. In a binocular telescope, the combination with two eye pieces and two optical erecting means respectively associated therewith, of common means inclosing both eye pieces and optical erecting means and engaged therewith for simultaneously varying the distances between each eye piece and its erecting means to vary the magnification of the instrument.

In testimony whereof I affix my signature in presence of two witnesses.

FREDERICK L. G. KOLLMORGEN.

Witnesses:
 MARY H. LEWIS,
 CLARENCE G. CAMPBELL.